July 9, 1946.   G. M. DEMING   2,403,508
AIRCRAFT BREATHING REGULATOR
Filed Jan. 26, 1943   5 Sheets-Sheet 2

INVENTOR.
George M. Deming
BY
ATTORNEYS

Patented July 9, 1946

2,403,508

UNITED STATES PATENT OFFICE 2,403,508

AIRCRAFT BREATHING REGULATOR

George M. Deming, Orange, N. J., assignor to Air Reduction Company, Incorporated, a corporation of New York Application January 26, 1943, Serial No. 473,627

18 Claims. (Cl. 128—191)

This invention relates to breathing apparatus for supplying oxygen to aviators, and more particularly to improvements in an oxygen regulator of the so-called demand type, that is, the type in which the oxygen is supplied only in response to inhalations by the aviator.

The type of oxygen regulator to which this invention relates in particular has two stages of pressure reducing mechanism for the incoming oxygen. The first-stage oxygen regulating valve admits oxygen to a first-stage chamber and is controlled by a diaphragm forming one wall of this chamber. The second-stage regulating valve admits oxygen from the first-stage chamber to a second-stage chamber and is controlled by a second diaphragm which forms one wall of the second-stage chamber and which is exposed at its outer side to atmospheric pressure. The oxygen passes from the second-stage chamber through a port into a respiratory chamber, or mixing chamber, communicating with the breathing mask. Outside air is admitted to the mixing chamber through a second port. The oxygen and air ports leading into the mixing chamber are controlled by oxygen-proportioning and air-proportioning valves which in turn are controlled by an aneroid device so that the oxygen concentration in the gas breathed by the aviator is varied automatically in accordance with altitude requirements. The regulator supplies air with no oxygen enrichment at sea level and for relatively low altitudes up to say 5,000 feet, and a mixture of oxygen and air from that altitude up to say 33,000 feet, the concentration of oxygen gradually increasing as the altitude becomes higher. Around 33,000 feet the air-proportioning valve fully closes so that at this altitude, and higher altitudes, only oxygen is breathed by the aviator.

Among the objects of this invention are to improve the construction and operation of an oxygen regulator of the type above described; to make it compact in construction and of light weight; to insure an adequate oxygen concentration in the gas mixture at the intermediate altitudes as well as the higher altitudes; and to provide certain improvements which are desirable and useful not only in an oxygen regulator of the kind above described but in other regulators as well; and in general to provide a more satisfactory oxygen-regulator.

In accordance with the invention the parts of the regulator are so constructed and related, particularly the two stages of the pressure reducing mechanism for the oxygen, as to make for compactness and reduction in size of the apparatus. The second-stage oxygen regulating valve is constructed in a novel manner to overcome certain disadvantages of the corresponding valve in previous oxygen regulators and to improve its operation and the operation of the oxygen regulator as a whole. The oxygen-proportioning and air-proportioning valves are mounted and correlated in an improved manner, and each of these valves is so constructed that the danger of insufficient suction in the mixing chamber for intermediate altitudes, and hence a too low concentration of oxygen in the gas mixture for such altitudes, is avoided. There is an automatic oxygen by-pass valve for admitting extra oxygen from the second-stage chamber to the mixing chamber when occasion demands, as hereinafter described, and an emergency by-pass controlled by a hand-operated valve connects the oxygen inlet with the mixing chamber. The oxygen regulator is also provided with manually operable control means which may be actuated by the aviator either to render effective the mechanism for automatically mixing the oxygen and air in accordance with altitude requirements, or to render it ineffective and simultaneously close the air-proportioning valve and fully open the oxygen-proportioning valve, and at the same time mechanically open the above-mentioned automatic oxygen by-pass valve.

An oxygen regulator constructed in accordance with the invention and embodying the various features above referred to is illustrated in the accompanying drawings, in which.

Figure 1:
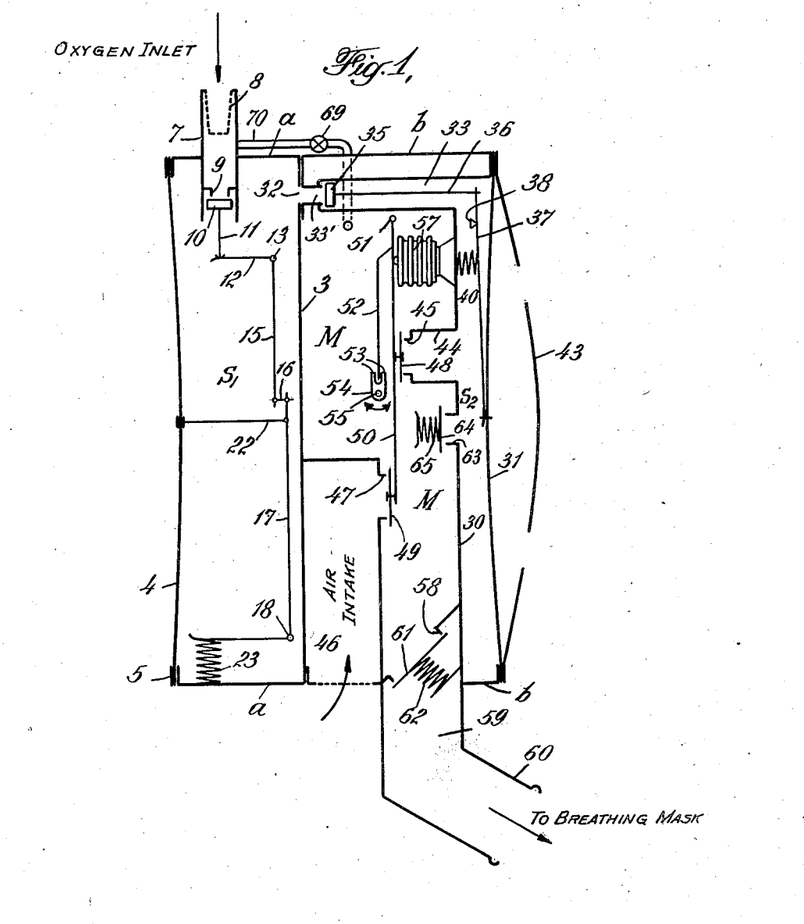
Figure 1 is a diagrammatic representation of the oxygen regulator, and Figs. 2 to 10 inclusive illustrate one form of the regulator as actually constructed.

Before proceeding with a detail description of the oxygen regulator it should be explained that Figs. 2-10 illustrate one type of regulator as actually constructed but these figures are drawn to an enlarged scale and it should be understood that the regulator is much smaller in size than they indicate. The diagram of Fig. 1 is included so that the description of Figs. 2-10 will be easier to follow. Some liberties had to be taken in diagrammatically representing the construction and relationship of the various parts but in most respects Fig. 1 is in conformity with the other figures. Parts referred to in the description but not found in Fig. 1 will be found in the other figures.

The main casing of the regulator comprises two hollow cylindrical sections $a$ and $b$ adapted to be clamped together by means of bolts 1 (Fig. 2) with an annular gasket 2 interposed between them.

Figure 2:
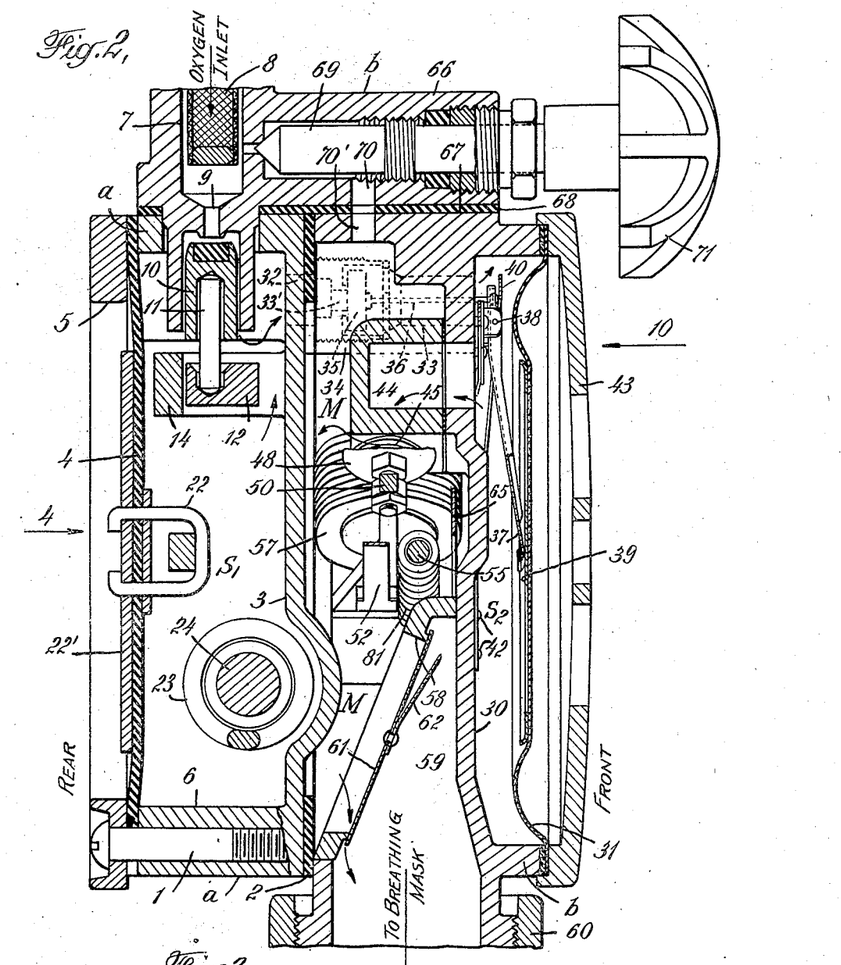
Fig. 2 is a vertical transverse section taken substantially on the center line of the regulator.
Figure 4:
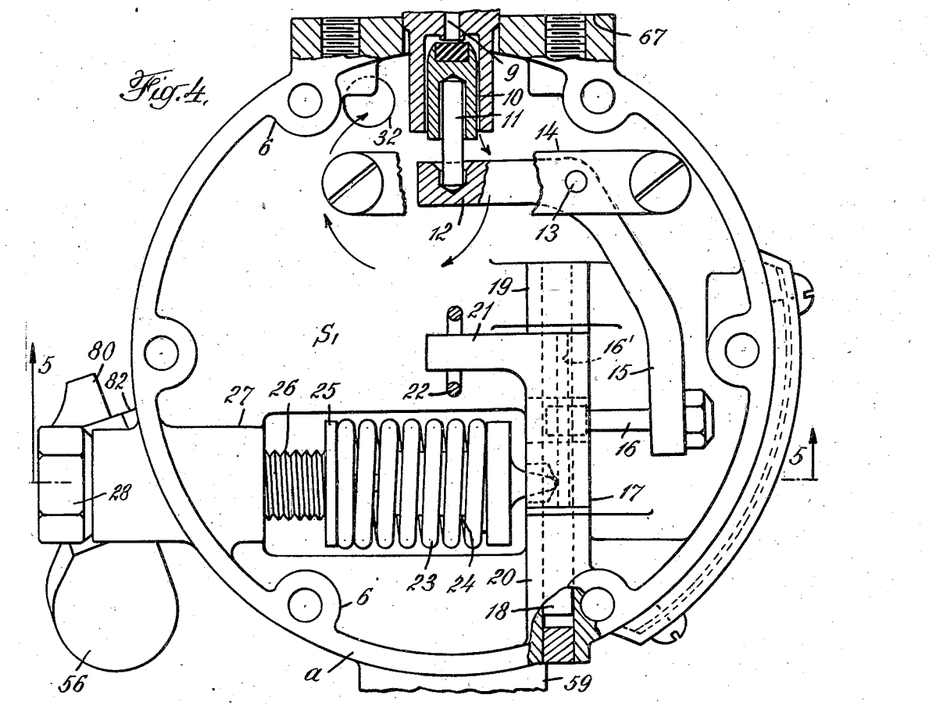
Fig. 4 is a rear view looking into the first-stage oxygen chamber in the direction of the arrow 4 in Fig. 2, the diaphragm being removed to expose to view the mechanism within the chamber, and some of the parts being shown in section.
Figure 5:
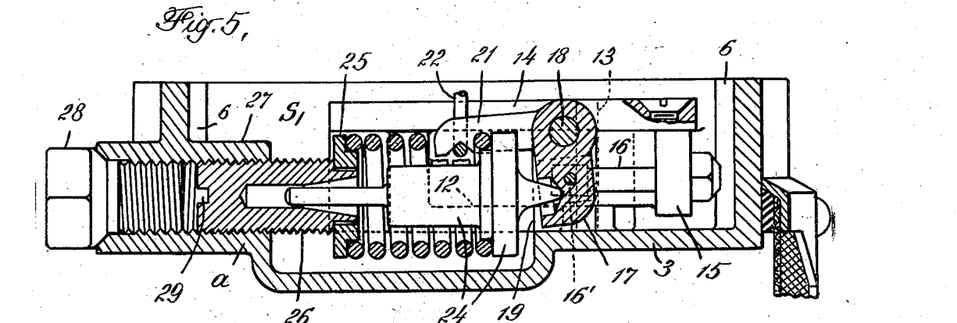
Fig. 5 is a horizontal section taken on the line 5—5 of Fig. 4.

The section $a$ has an integral inner or front wall 3. The annular opening at the rear of the section $a$ is closed by a diaphragm 4 clamped to the cylindrical walls of this section by means of a clamping ring 5 and the bolts 1. The bolts (only one of which shows in the drawings) pass through bolt holes in the clamping ring 5 and the diaphragm, loosely through bolt holes in bosses 6 formed on the inner surface of the cylindrical walls of the section $a$ (Fig. 4), through openings in the gasket 2, and then into threaded openings in bosses 6' at the inner surface of the cylindrical walls of the section $b$ (Fig. 6), thus clamping all these parts together. The cylindrical walls of the section $a$ and its inner wall 3 and the diaphragm 4 form an enclosure which constitutes the first-stage oxygen chamber $S_1$. Oxygen is admitted to this chamber through an inlet 7 provided with a suitable filter screen 8. It then passes through a port 9 commanded by the first-stage regulating valve 10. One end of a valve rod 11 projects into a recess in the body of the valve 10 (Figs. 2 and 4) and the other end of the valve rod projects into a recess in one arm 12 of a bell-crank lever. This bell-crank lever is mounted to swing about the axis of a pivot pin 13 (Fig. 4) which has a bearing at one end in the inner wall 3 of the casing section $a$, and at its other end in a bar 14 supported in spaced relation to the wall 3. The other arm 15 of the bell-crank lever is connected by means of a link 16 to an arm 17 of a second bell-crank lever which is mounted to swing about the axis of a pivot pin 18, the ends of which are mounted in bosses 19 and 20 (Fig. 4) projecting outwardly from the wall 3 of the casing section $a$. The link 16 is pivotally connected to the arm 17 of the bell-crank lever by means of a pivot pin 16'. The other arm 21 of this bell-crank lever is linked to the diaphragm 4 by means of the link 22 operatively connected to a plate 22' at the outer side of the diaphragm, as best shown in Fig. 2. A relatively strong coil spring 23 reacts at one end against the arm 17 of the bell-crank lever 17—21 through a fulcrum member and guide pin 24, and at its other end against a washer 25 carried by the end of an adjusting screw 26 (Figs. 4 and 5). The screw 26 turns in a boss 27 which is drilled and threaded to receive it. The opening at the outer end of the boss 27 is normally closed by means of a plug 28. When this plug is removed, the adjusting screw 26 may be turned by means of a screw driver, the outer end of the screw having a slot 29 for this purpose. In this way the force exerted by the spring 23 on the arm 17 of the bell-crank lever 17—21 may be adjusted.

It will be apparent from the foregoing description that outward movement of the diaphragm 4 by the pressure of the oxygen in the first-stage chamber $S_1$ actuates the bell-crank levers in a direction to move the valve 10 toward its closed position and this action is yieldingly opposed by the coil spring 23. When the pressure in the chamber $S_1$ allows the diaphragm to move inwardly, the bell-crank levers are moved by the spring 23 in the opposite direction to permit the valve to be moved by the pressure of the incoming oxygen toward its open position. Oxygen admitted through the inlet 7 from a relatively high pressure source is reduced in pressure as it enters the chamber $S_1$ and this chamber remains filled with oxygen at a predetermined reduced pressure, the diaphragm and its associated parts functioning to close the valve to stop the admission of oxygen when the predetermined pressure is attained in the chamber $S_1$, and to open the valve and admit more oxygen when the pressure therein falls below the predetermined level.

The section $b$ of the casing is open at its rear but when the sections $a$ and $b$ are fastened together the rear wall 3 of the section $a$ constitutes a closure for the adjoining space in the section $b$. In other words, the wall 3 of the section $a$ forms a partition between the first-stage oxygen chamber $S_1$ and the adjacent space in the section $b$.

Figure 10:
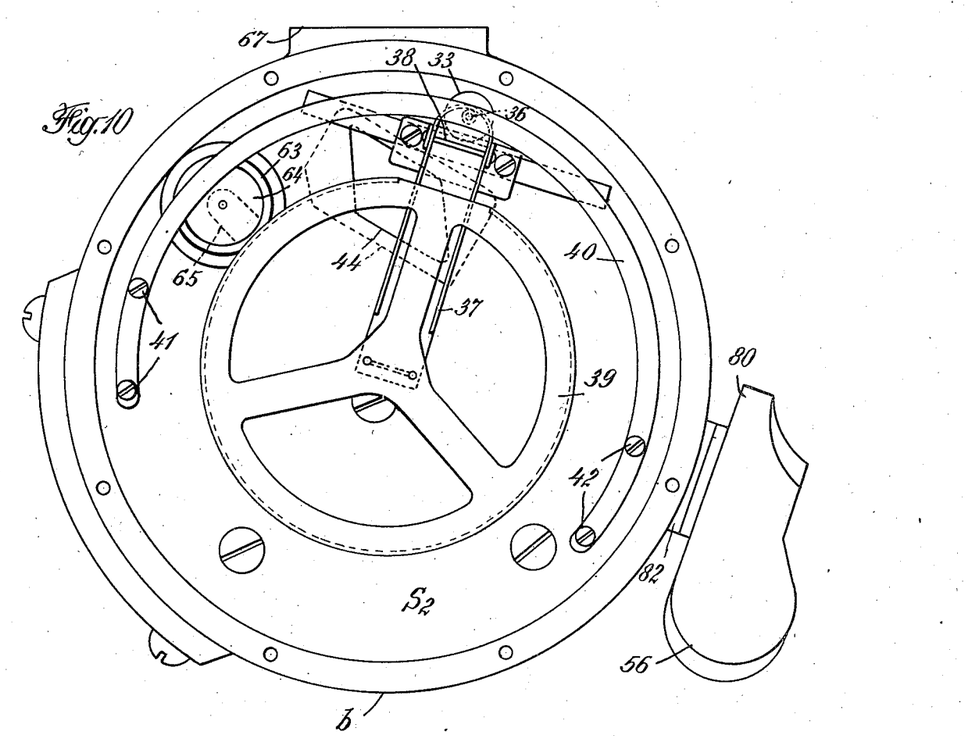
Fig. 10 is a front view looking into the second-stage oxygen chamber in the direction of the arrow 10 in Fig. 2, the diaphragm which forms one wall of this chamber being removed to expose to view the mechanism within the chamber.

The section $b$ of the casing has a partition 30. The space to the left of this partition, as viewed in Fig. 2, back to the wall 3 of the section $a$, constitutes a respiratory chamber, or mixing chamber M. A diaphragm 31 closes the opening at the front of the casing section $b$ and forms with the partition 30 the second-stage oxygen chamber $S_2$. Oxygen is admitted from the first-stage chamber to the second-stage chamber through a port 32 in the inner wall 3 of the first casing section $a$. This port communicates with a passage 33 (Figs. 1, 2 and 3) which extends through a boss 34 formed in the casing section $b$. The passage 33 at its delivery end communicates with the second-stage oxygen chamber $S_2$. The oxygen enters the passage 33 through a port 33' controlled by the second-stage regulating valve 35. The rod 36 of this valve is pivotally connected to one end of a lever 37 (see also Fig. 10) fulcrumed to the casing at 38. The other end of the lever 37 is pivotally attached to a spider 39 which bears against the diaphragm 31 (Fig. 2). A relatively light spring 40 acts on the end of lever 37 and the end of rod 36 in a direction which tends to close the valve 35 and force the diaphragm 31 outwardly. As best shown in Fig. 10 the spring 40 preferably comprises an arcuate strip of metal which is fastened at its two ends to the partition 30, as shown at 41 and 42, and bears at its mid-section upon the end of the valve rod 36 and the end of the lever 37. The diaphragm 31 is protected by a perforated cover 43 (Fig. 2), the openings in which cause the diaphragm to be subjected at its outer side to atmospheric pressure. The supply of oxygen to the second-stage chamber $S_2$ from the first-stage chamber $S_1$ is so controlled by this arrangement that oxygen is maintained in the second-stage chamber substantially at atmospheric pressure regardless of altitude. The oxygen in the second-stage chamber $S_2$ first passes into a hollow boss or housing 44 extending rearwardly from the partition 30 (Figs. 2 and 6) and then through a port 45 formed in a side wall of the boss and which communicates with the mixing chamber M. Outside air is admitted to the mixing chamber M through an intake passage 46 (Fig. 6) and a port 47 at the inner end of this passage.

Figure 6:
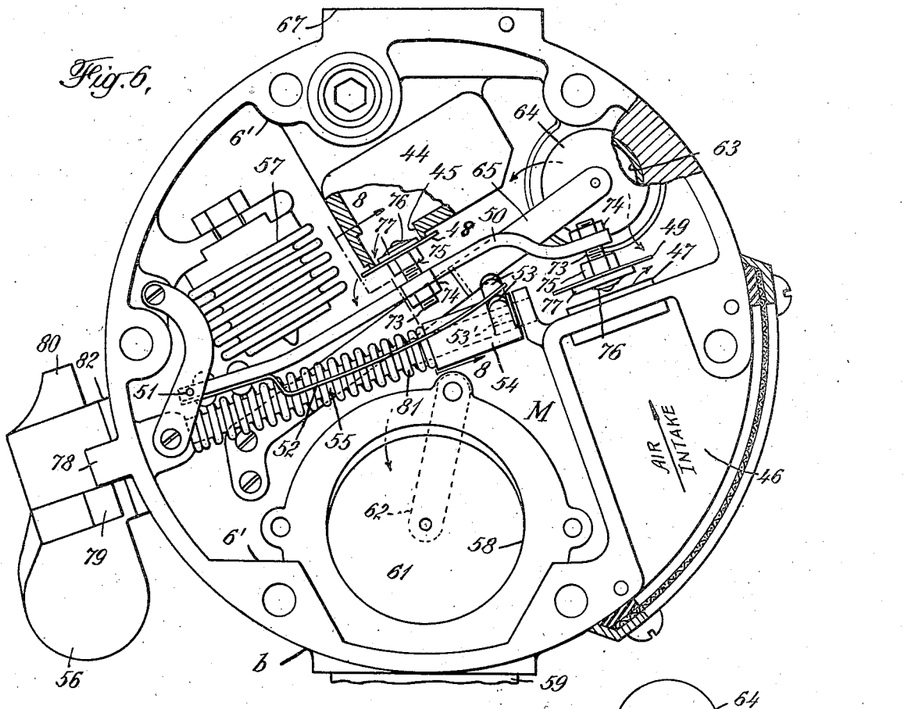
Fig. 6 is a rear view looking into the respiratory chamber, or mixing chamber, the casing portion shown in Fig. 4 which is normally fastened to the rest of the casing at the rear of the mixing chamber being removed to expose to view the mechanism within the mixing chamber.
Figure 7:
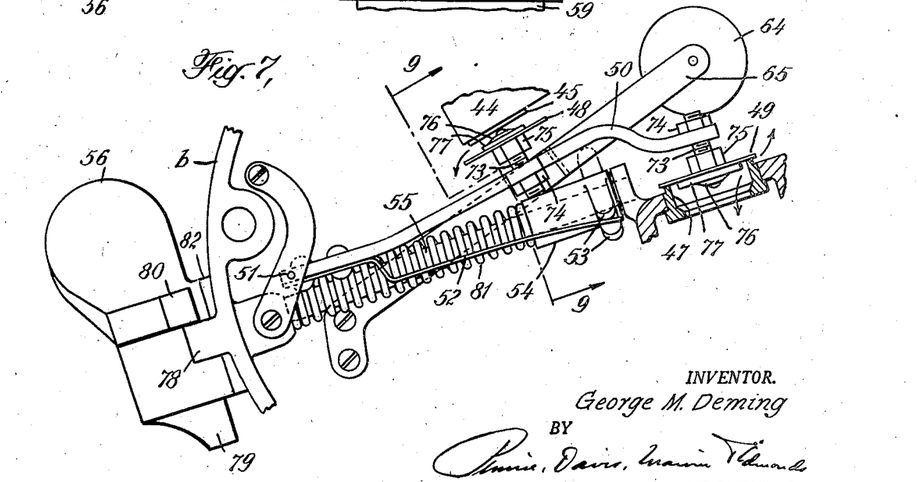
Fig. 7 is a detail view of the manually operable mechanism for rendering either effective or ineffective the mechanism for automatically mixing the oxygen and air in accordance with altitude requirements.

The oxygen port 45 is controlled by an oxygen-proportioning valve 48 and the air port 47 is controlled by an air-proportioning valve 49. These valves are adjustably mounted on opposite sides of a common lever 50 pivoted at 51 (Figs. 6 and 7). As shown in these figures the oxygen valve is nearer to the pivot of the lever than the air valve. The lever 50 has attached to it a leaf spring 52, the free end of which engages between two lugs 53 (see also Figs. 8 and 9) projecting from a cam-sleeve 54 mounted on a shaft 55 adapted to be turned a limited distance in one direction or the other by a handle 56 located outside of the casing. As best shown in Figs. 6 and 7 there is a stop 78 on the outside of the casing section 2, and a stop 79 on the handle 56 limits the turning movement of the shaft in one direction, while a second stop 80 on the handle limits the turning movement of the shaft in the other direction. A coil spring 81 surrounding the shaft reacts at one end against the casing wall and at its other end against the cam-sleeve 54 to keep the inner surface of the handle 56 pressed against a gasket 82 to provide a fluid-tight seal at this place. When the shaft 55 is turned in a counter-clockwise direction, as viewed in Figs. 8 and 9, and in a clockwise direction as viewed in Fig. 1, the leaf spring 52 is deflected toward the lever 50 and this biases the lever toward the end of an aneroid bellows 57 (Fig. 6). The concentration of the oxygen in the gas in the mixing chamber M will then be varied automatically by the aneroid in accordance with altitude requirements, the arrangement being such that at sea level and for altitudes up to say 5000 feet the air-proportioning valve 49 is fully open and the oxygen-proportioning valve 48 is completely closed. At around 5000 feet the aneroid moves the lever 50, and the air-proportioning valve 49 begins to close and the oxygen proportioning valve 48 begins to open. As the altitude increases, the oxygen-proportioning valve 48 is gradually opened to a greater extent and the air-proportioning valve is gradually closed to a greater extent until at say 33,000 feet the air-porportioning valve is fully closed. The gas in the mixing chamber M, whether air alone, a mixture of air and oxygen, or pure oxygen, is withdrawn when the aviator inhales, and passes through a port 58 (Fig. 2) into a passage 59 in a neck portion 60 (see also Fig. 1) which is adapted to be connected to the breathing mask by a suitable hose or conduit. A check valve 61 preferably comprising a light disc of mica or similar material commands the port 58 and is biased closed by a light spring 62.

The partition 30 is provided with another port 63 (Figs. 6 and 10) commanded by a valve 64 carried at the end of a light spring arm 65. This valve also preferably comprises a light disc of mica. The valve 64 constitutes an automatic by-pass valve which admits oxygen from the second-stage chamber $S_2$ to the mixing chamber M when the pressure in the latter is reduced to a certain amount, i. e., when the suction in the mixing chamber increases to a certain value.

Figure 8:
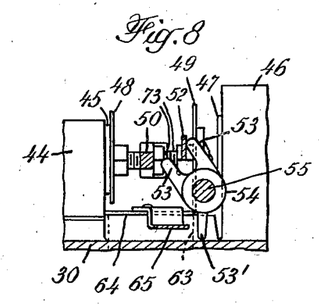
Fig. 8 is a section taken on the line 8—8 of Fig. 6.
Figure 9:
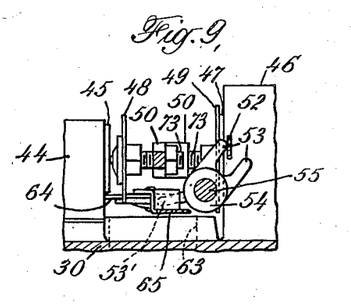
Fig. 9 is a section taken on the line 9—9 of Fig. 7.

When the handle 56 is actuated to turn the shaft 55 in a clockwise direction, as viewed in Figs. 8 and 9, one of the lugs 53 on the cam-sleeve 54 deflects the leaf spring 52 away from the lever 50 and this biases the lever away from the end of the aneroid 57 and completely closes the air-proportioning valve 49 and completely opens the oxygen-proportioning valve 48. This may be accomplished by the aviator regardless of altitude and whenever it is desired that pure oxygen be delivered to the breathing mask. When the shaft 55 is turned as just described to open the oxygen-proportioning valve and close the air-proportioning valve, a third lug 53' carried by the cam-sleeve 54 (Figs. 7, 8 and 9) engages under and lifts the spring arm 65 to effect mechanical opening of the oxygen by-pass valve 64 so that there is a full and free supply of oxygen into the mixing chamber M by reason of the fact that both oxygen valves 48 and 64 are then open.

Figs. 6 and 8 show the shaft 55 and cam-sleeve 54 turned by the handle 56 to the position in which oxygen-proportioning valve 48 is biased closed, the air-proportioning valve 49 is biased open, the oxygen by-pass valve 64 is closed, and the lever carrying the valves 48 and 49 is in position to be automatically controlled by the aneroid. Figs. 7 to 9 show the shaft 55 and cam-sleeve 54 turned by the handle 56 to the position in which the oxygen-proportioning valve 48 and the oxygen by-pass valve 64 are moved to open position and the air-proportioning valve 49 is moved to closed position.

The oxygen inlet is formed in a casting which has a portion 66 (Fig. 2) extending toward the front of the regulator. The bottom of this casting has a flat seating surface, and as will be seen from Figs. 4, 6 and 10, there is a narrow flat seat 67 at the top of the casing sections $a$ and $b$ to which the above-mentioned casting may be bolted with a gasket 68 (Fig. 2) intervening. The portion 66 of the casting houses a valve 69 which controls the flow of oxygen through by-pass passages 70 from the oxygen inlet to the mixing chamber. As shown in Fig. 2, portions of the by-pass passages are drilled in the casting which houses the valve 69 and they communicate with a port 70' drilled through the top wall of the casing section $b$ into the mixing chamber. The valve 69 may be opened or closed by means of a knob 71 at the front of the regulator. The valve 69 is normally closed but it may be opened by the aviator in any emergency in which it is desirable to admit oxygen directly from the oxygen inlet to the mixing chamber and thence to the breathing mask.

In an oxygen regulator, particularly of the type herein disclosed, it is important that the second-stage oxygen regulating valve, or corresponding valve admitting oxygen to a relatively low-pressure chamber, be carefully designed and constructed so that it will work efficiently, and be properly seated by the low-pressure oxygen behind it. The successful operation of this valve depends upon facing its seat-contacting surface with a very thin, smooth and uniform layer of soft rubber. It is not practicable to cement the thin layer of soft rubber to the valve body in the region where the valve contacts with the lip of the valve seat because any cement capable of attaching the thin rubber to the valve body distorts the thin rubber enough to cause leaks. It has been attempted to avoid this difficulty by applying a small droplet of cement at the very center of the valve but then the soft rubber layer was not affixed firmly enough and it was likely to become detached. Moreover, with this arrangement small particles of foreign material are likely to be caught between the valve body and the rubber facing.

Figure 3:
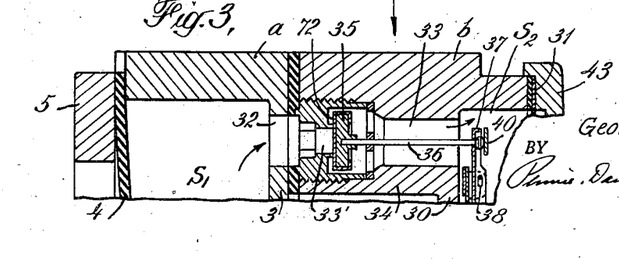
Fig. 3 is a vertical transverse section through that part of the regulator where the second-stage oxygen regulating valve is located to show the construction of this valve.

In the improved oxygen regulator herein disclosed the second-stage regulating valve is free of these objections and disadvantages. As shown in Fig. 3, the body of the valve, which may be substantially in the form of a disc and be made of metal or relatively hard rubber, is provided with a slip-on rubber covering as indicated at 72. This covering is in the form of an envelop made of thin soft rubber and is slipped over the valve disc so that it embraces the disc and covers the same except where the opening occurs in the rubber envelop at the rear of the valve disc, as indicated in Fig. 3. The rubber envelop is held in place by its own elasticity and is not readily detached. Moreover small particles of foreign matter cannot readily get under the rubber covering, but should they do so the rubber covering may be easily removed, the surface cleaned, and the covering again slipped on the valve body.

An important feature of the invention is the particular construction of the oxygen-proportioning and air-proportioning valves. As best shown in Figs. 6 and 7 each of these valves 48 and 49 may comprise a thin disc made of mica or similar material. Each of the valve discs is carried by the end of a screw 73 threaded into the lever 50 and locked thereto by means of a nut 74. Each of the valve discs may therefore be adjusted relative to the lever which carries it and relative to its valve seat. The outer end of the screw 73 carries a nut 75 against which the valve disc is pressed by means of a spring washer 76. This washer does not bear directly against the valve disc but against a small plate 77 interposed between it and the valve disc. The plate 77 of the air-proportioning valve is made slightly thicker than the plate 77 of the oxygen-proportioning valve. The diameter of the plate 77 is somewhat less than the inside diameter of the port controlled by the valve. Except when the valve disc is rather widely displaced from its seat, the plate 77 actually enters the port with a small annular clearance. When the valve disc is very close to the valve seat the annular clearance between the walls of the port and the plate 77 is so much greater than the clearance between the disc and the lip of the valve seat that the discharge of gas is largely under the control of the disc. When the disc is displaced its maximum distance from the valve seat the displacement is so much greater than the thickness of the plate 77 that again the discharge of gas is predominantly under the control of the disc. At intermediate displacements, however, the plate 77 brings about a very considerable control of the discharge of gas and produces a throttling action. It is thus evident that the influence of the throttling plate 77 is greatest for intermediate positions of the valve disc. The effect of the throttling plate 77 is to introduce relatively high resistances to the flow of air into the mixing chamber at the lower altitudes. The diameter of the seat lip at the end of the air port may therefore be greater than otherwise, and as a result a better control may be effected on oxygen concentration for altitudes around 25,000 feet.

An oxygen regulator of the type herein disclosed could no doubt be designed so that the suction in the mixing chamber is sufficient to give the proper oxygen concentration for all altitudes without the use of a throttling plate on the air-proportioning valve as just described, provided the apparatus is free from air leaks. However, air leakage is sometimes unavoidable and this will decrease the suction in the mixing chamber. It so happens that in oxygen regulators of the general type herein disclosed, the suction in the mixing chamber for intermediate altitudes is such that the pressure in this chamber is usually not much less than the pressure in the second-stage chamber $S_2$. An air leak may have a relatively insignificant effect in decreasing oxygen concentration as a direct result of the leak if there is sufficient suction in the mixing chamber, but if the pressure therein is already very close to the pressure in the second-stage oxygen chamber then the effect of the leak becomes serious in that the oxygen induction into the mixing chamber tends to cease and as a consequence the amount of air admitted by the air-proportioning valve will increase. The throttling plate on the air-proportioning valve restricts the flow of air into the mixing chamber at intermediate altitudes and therefore insures a sufficient oxygen concentration at the intermediate altitudes. The oxygen concentration when the regulator has an air leak of say .169" in diameter is, in general, considerably lower when no throttling plate is employed on the air-proportioning valve than when the throttling plate is used, or for the same minimum oxygen concentration in the inspired air, the throttling of the air at intermediate altitudes permits breathing when there is a leak of say .194" in diameter instead of a leak of only .169" in diameter. In other words, the area of the leak may be increased 40%.

The danger of low oxygen concentration at low altitudes is negligible. Consequently the regulator herein disclosed is so designed that at very low altitudes, the inspiratory resistances will be low without any danger of seriously affecting the oxygen concentration in event of a mask leak. Moreover, the inspiratory resistances should be low at very low altitudes because when operating with the automatic mixing mechanism thrown out of operation, the oxygen consumptions, close to sea level when doing heavy work, are so great that there is a serious tendency for the inspiratory resistances during "denitrogenation" to become so great as to be insufferable. This tendency has been minimized in the regulator herein disclosed through the use of the above described automatic oxygen by-pass valve which may be opened by means of the handle 56 during denitrogenation.

It will now be seen that the regulator is very compact in construction and this is due at least in part to the location of the operating parts of the first-stage chamber, including the spring 23, at the inner side of the diaphragm 4, i. e., within the first-stage chamber itself. The improved construction of the second-stage regulating valve and the oxygen-proportioning and air-proportioning valves improves the operation of the regulator as above pointed out, and such parts as the automatic oxygen by-pass valve, the emergency by-pass valve, and the mechanism operable by the aviator for throwing the automatic mixing mechanism for the oxygen and air into and out of operation and for positively opening the automatic oxygen by-pass valve, provide desirable safety features for the regulator and add to its usefulness and convenience of operation by the aviator, and in general make it a more satisfactory regulator.

I claim:

1. An oxygen regulator for aviators comprising a respiratory chamber, an oxygen chamber, a valve-controlled port through which oxygen may be drawn into the respiratory chamber from the oxygen chamber upon inhalation by the aviator, and a valve-controlled port through which air may be drawn into the respiratory chamber upon inhalation by the aviator, the valve of said last-named port having means effective only for intermediate open positions of the valve for increasing the amount of throttling action that would be obtained by the valve at such intermediate open positions in the absence of said means.

2. An oxygen regulator for aviators comprising a respiratory chamber, an oxygen chamber, a valve-controlled port through which oxygen may be drawn into the respiratory chamber from the oxygen chamber upon inhalation by the aviator, and a valve-controlled port through which air may be drawn into the respiratory chamber upon inhalation by the aviator, each of said valves having means effective only for intermediate open positions of the valve for increasing the amount of throttling action that would be obtained by the valve at such intermediate open positions in the absence of said means.

3. An oxygen regulator for aviators comprising a respiratory chamber, an oxygen chamber, a valve-controlled port through which oxygen may be drawn into the respiratory chamber from the oxygen chamber upon inhalation by the aviator, a port through which air may be drawn into the respiratory chamber upon inhalation by the aviator, an air valve controlling said last-named port and comprising a thin disc, a seat encircling the exit end of the air port and against which one side of said disc is adapted to seat, and a throttling plate at said side of the disc, said plate being of smaller diameter than the inside diameter of the air port and being adapted to project into the air port with a small annular clearance except when the disc is widely displaced from its seat at which time said plate lies entirely outside of the air port.

4. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, each of said valves comprising a thin disc and each disc cooperating with a seat encircling the exit end of the corresponding port and against which one side of the disc is adapted to seat, and a throttling plate on each of said discs at the side which contacts with the seat, each of the said plates being of smaller diameter than the inside diameter of the corresponding port and being adapted to project into the corresponding port with a small annular clearance except when the disc carrying it is widely displaced from its seat at which time the plate lies entirely outside of the port.

5. An oxygen regulator in accordance with claim 4 in which the plate on the valve-disc for the air port is thicker than the plate on the valve disc for the oxygen port.

6. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, and an aneroid which regulates the opening of the air valve in accordance with the altitude, the air valve having means effective only for intermediate open positions of the valve for increasing the amount of throttling action that would be obtained by the valve at such intermediate open positions and for intermediate altitudes in the absence of said means.

7. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, and an aneroid which regulates the opening of the air valve and the oxygen valve in accordance with the altitude, the air valve having means effective only for intermediate open positions of the valve for increasing the amount of throttling action that would be obtained by the valve at such intermediate open positions and for intermediate altitudes in the absence of said means.

8. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, and an aneroid which regulates the opening of the air valve and the oxygen valve in accordance with the altitude, the air valve and the oxygen valve each having means effective only for intermediate open positions of the valve for increasing the amount of throttling action that would be obtained by the valve at such intermediate open positions and for intermediate altitudes in the absence of said means.

9. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, and a pivoted lever on which both the oxygen valve and the air valve are mounted so that movement of the lever moves one of the valves toward closed position and the other valve toward open position.

10. An oxygen regulator in accordance with claim 9 in which one of the valves is mounted on the lever closer to the pivot of the lever than the other valve.

11. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, and means manually operable by the aviator and operatively connected to both valves for mechanically and positively closing the air valve and simultaneously opening the oxygen valve.

12. An oxygen regulator for aviators comprising a respiratory chamber, an oxygen chamber, a port through which oxygen may be drawn into the respiratory chamber from the oxygen chamber upon inhalation by the aviator, an oxygen-proportioning valve controlling said port, a port through which air may be drawn into the respiratory chamber upon inhalation by the aviator, an air-proportioning valve controlling the air port, a check valve constituting an oxygen by-pass valve opening toward said respiratory chamber, and means operable by the aviator for closing the air-proportioning valve and for simultaneously opening the oxygen-proportioning valve and said oxygen by-pass valve.

13. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, an aneroid device adapted to automatically control the position of the air valve in accordance with the altitude, and means operable by the aviator for either placing the air valve under the automatic control of the aneroid device or discontinuing the influence of the aneroid device upon the air valve.

14. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, an aneroid device adapted to automatically control the position of the air valve and the oxygen valve in accordance with the altitude, and means operable by the aviator for either placing the air valve and oxygen valve under the automatic control of the aneroid device or discontinuing the influence of the aneroid device upon said valves.

15. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, a pivoted lever on which both the oxygen valve and the air valve are mounted, an aneroid device adapted to act on said lever to adjust the position of the two valves in accordance with the altitude, and means operable by the aviator for moving said lever to one position in which it is under the influence of the aneroid device or to another position in which it is out of the influence of the aneroid device.

16. An oxygen regulator for aviators comprising a respiratory chamber, an oxygen chamber, a valve-controlled port through which oxygen may be drawn into the respiratory chamber from the oxygen chamber upon inhalation by the aviator, a valve-controlled port through which air may be drawn into the respiratory chamber upon inhalation by the aviator, a pivoted lever on which the air valve is mounted, an aneroid device adapted to act on said lever to adjust the position of the air valve in accordance with the altitude, and means operable by the aviator for moving said lever to one position in which it is under the influence of the aneroid device or to another position in which it is out of the influence of the aneroid device.

17. An oxygen regulator for aviators comprising a respiratory chamber, valves for admitting oxygen and air to the respiratory chamber upon inhalation by the aviator, means responsive to changes in atmospheric pressure for automatically controlling the position of said valves so that the oxygen concentration in the gas mixture in the respiratory chamber is varied automatically in accordance with altitude requirements, and means operable by the aviator for either placing said valves under the automatic control of said first-named means or discontinuing the influence of said means upon said valves.

18. An oxygen regulator for aviators comprising a respiratory chamber, an oxygen chamber, a port through which oxygen may be drawn into the respiratory chamber from the oxygen chamber upon inhalation by the aviator, an oxygen-proportioning valve controlling said port, a port through which air may be drawn into the respiratory chamber upon inhalation by the aviator, an air-proportioning valve controlling said port, a pivoted lever on which both the oxygen-proportioning valve and the air-proportioning valve are mounted, an aneroid device adapted to act on said lever to adjust the position of the two valves in accordance with the altitude, a check valve constituting an oxygen by-pass valve opening toward the respiratory chamber, and means operable by the aviator for moving said lever to one position in which it is under the influence of the aneroid device or to a second position in which it is out of the influence of the aneroid device and in which the air-proportioning valve is closed and the oxygen-proportioning valve is open, and means operating when the lever is moved to said second position to mechanically open said oxygen by-pass valve.

GEORGE M. DEMING.